Oct. 2, 1951 T. A. BANNING, JR 2,569,444
PROPELLER PITCH CONTROL
Filed Jan. 18, 1945 8 Sheets-Sheet 1

Inventor:

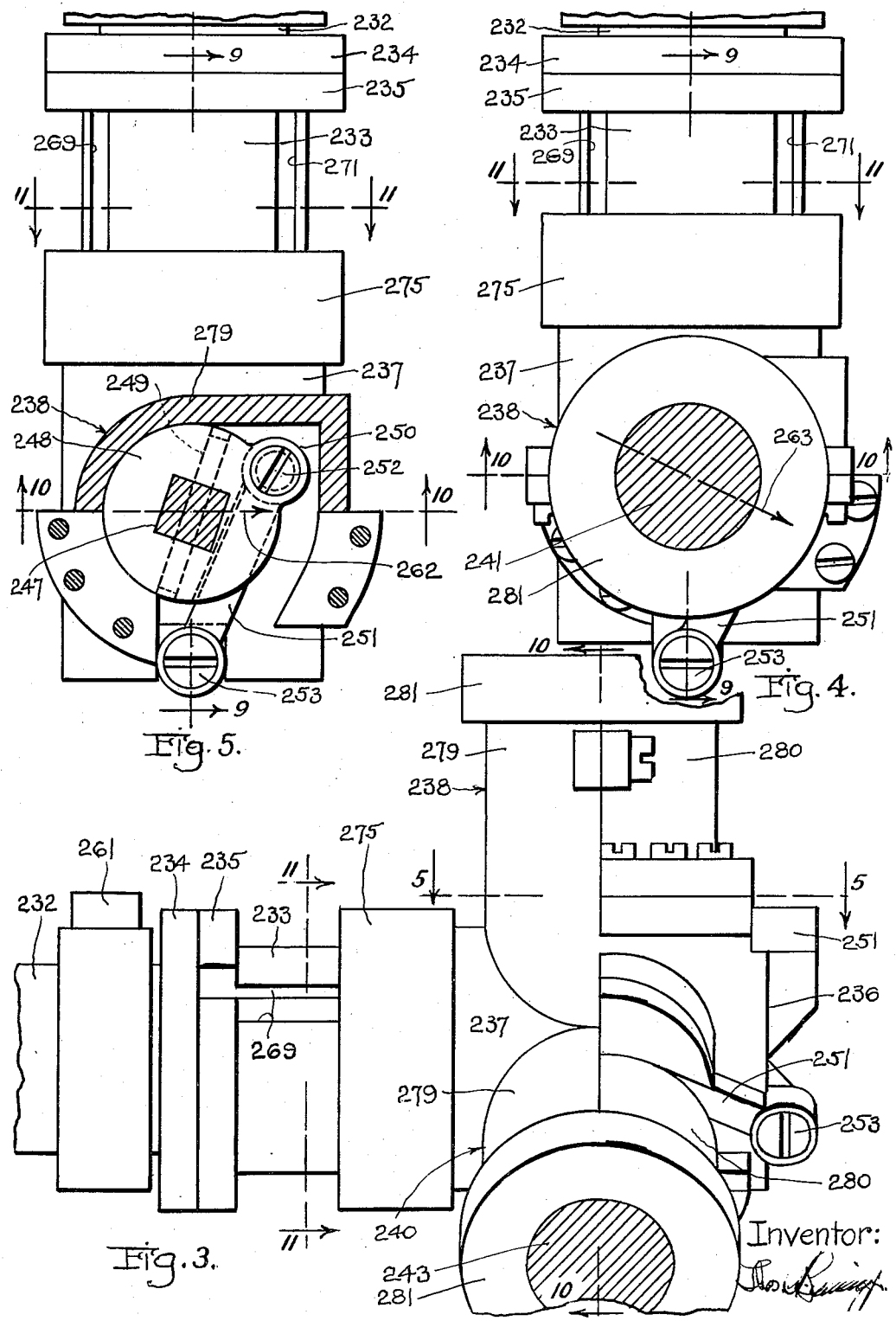

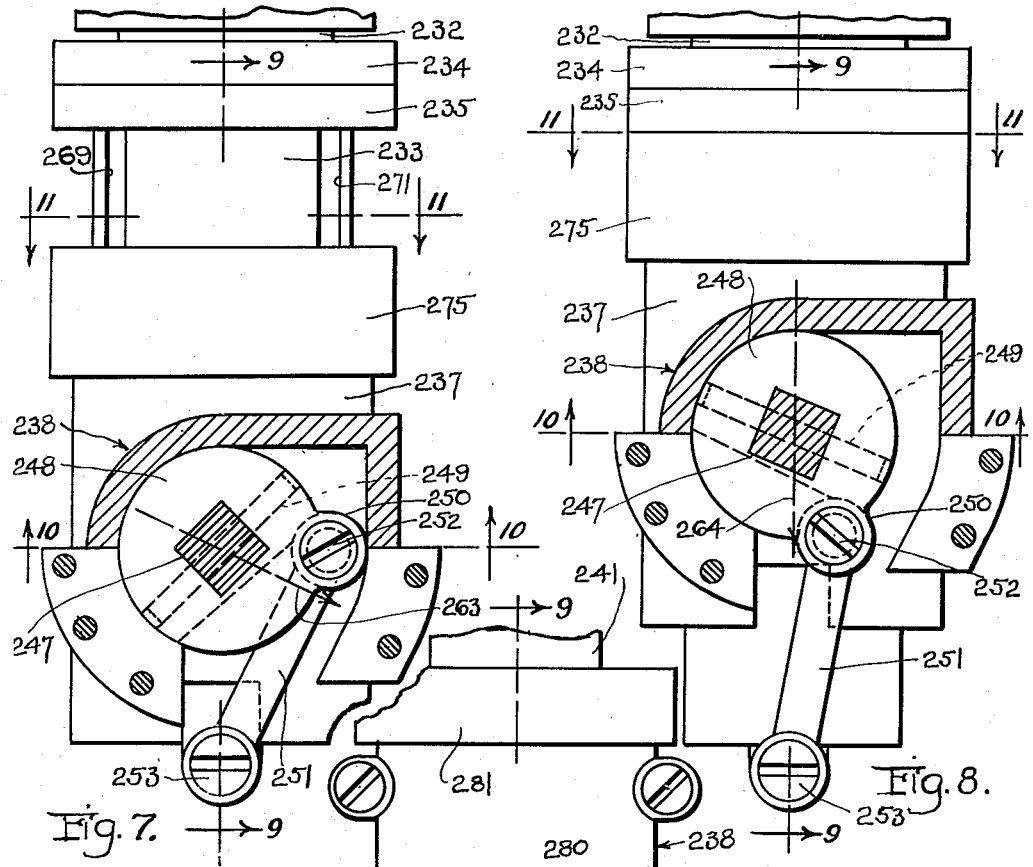
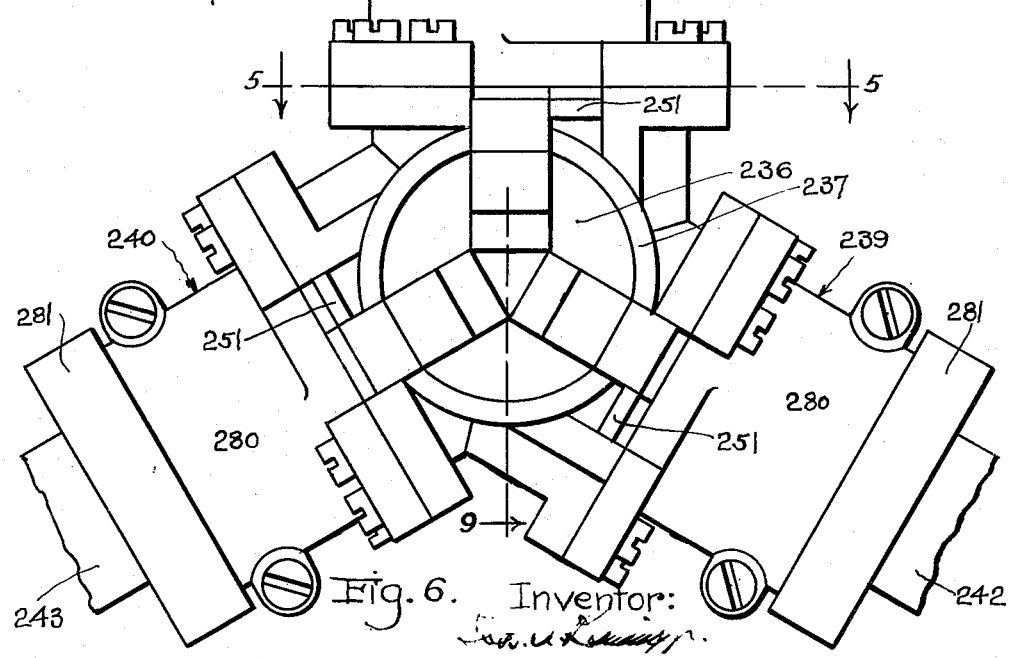

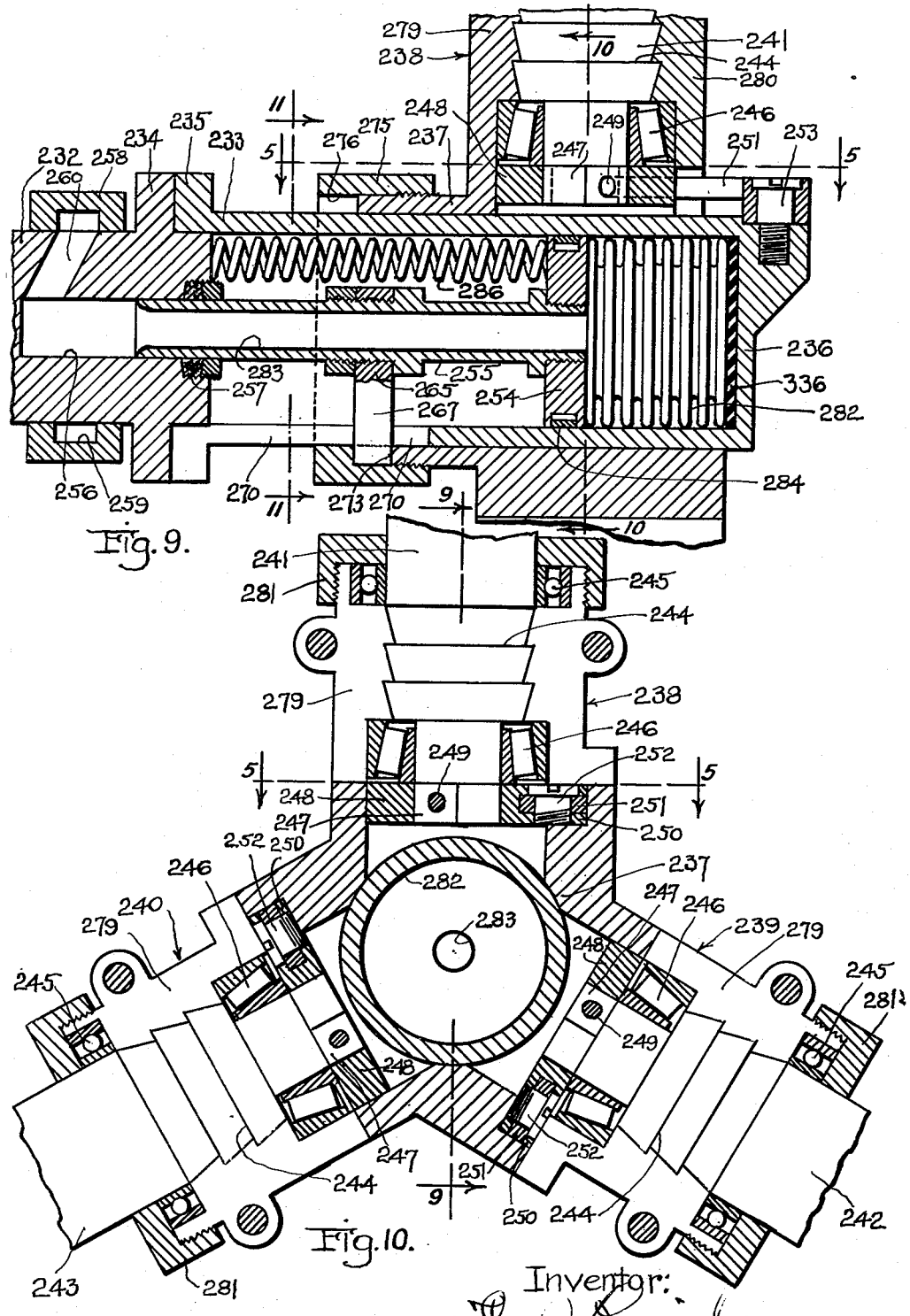

Oct. 2, 1951 — T. A. BANNING, JR — 2,569,444
PROPELLER PITCH CONTROL
Filed Jan. 18, 1945 — 8 Sheets-Sheet 5
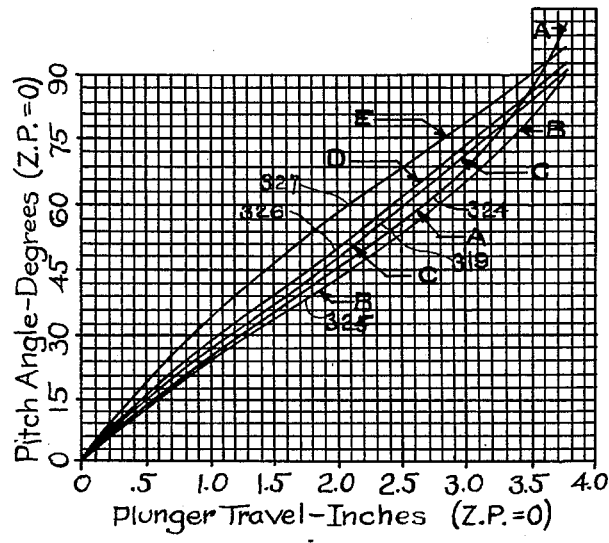
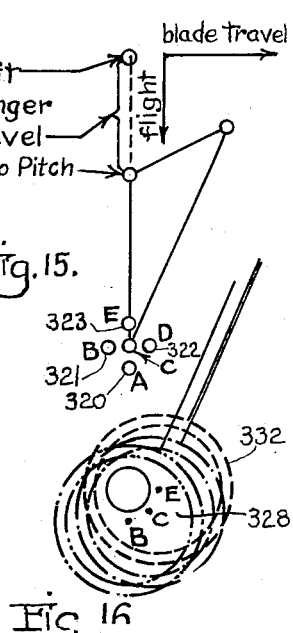
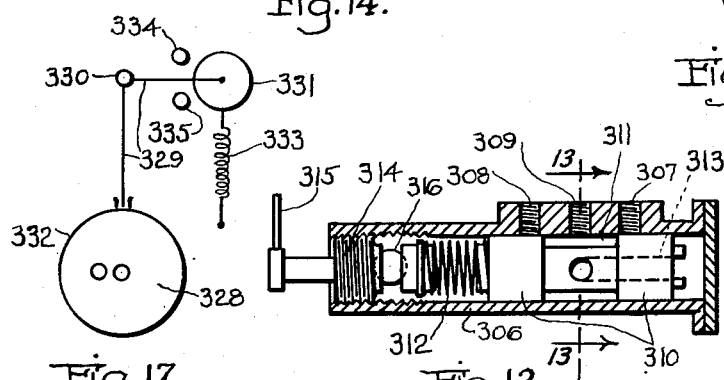
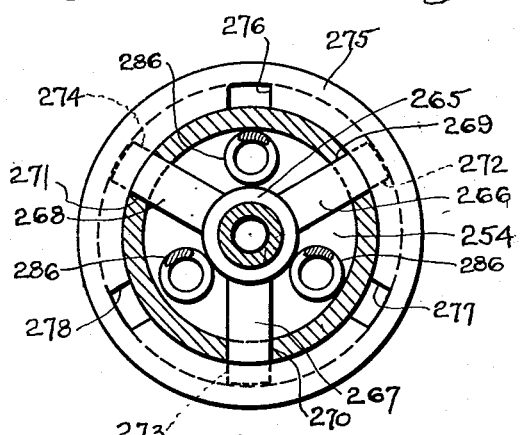
Inventor:

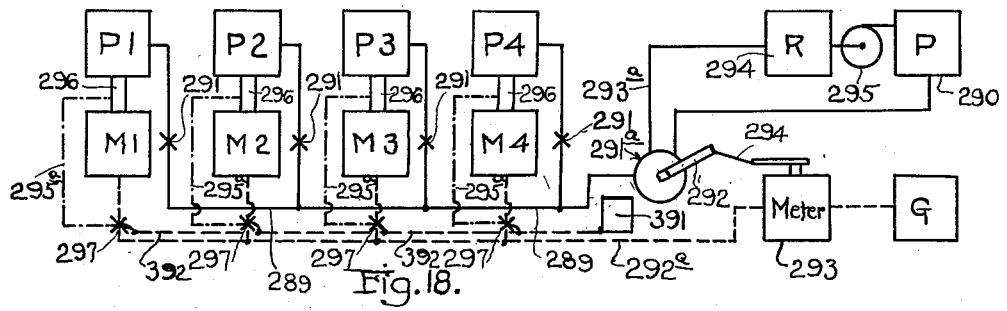
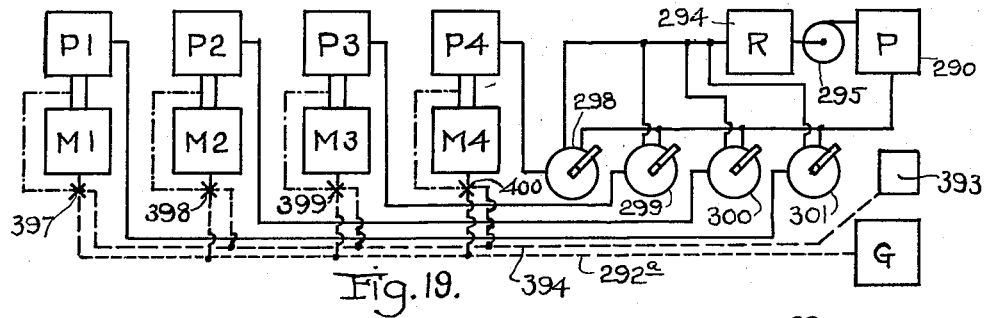
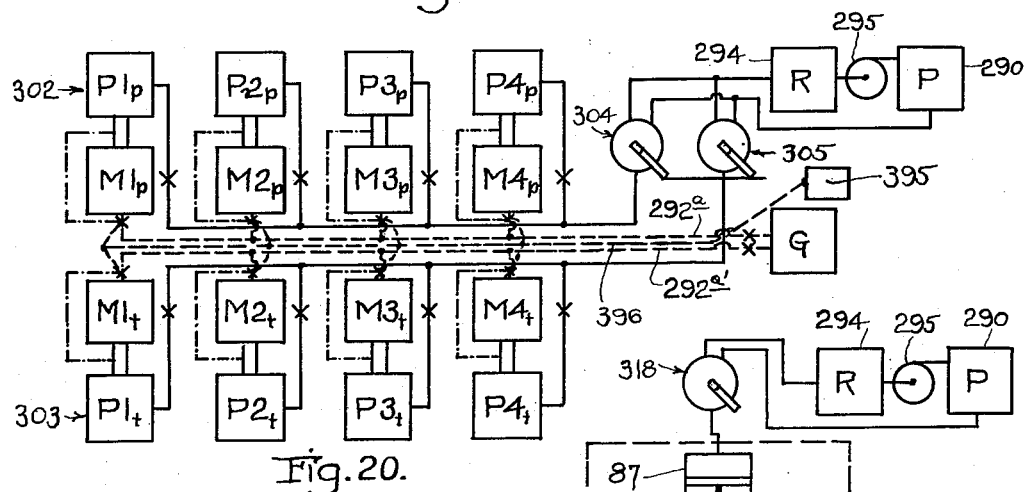
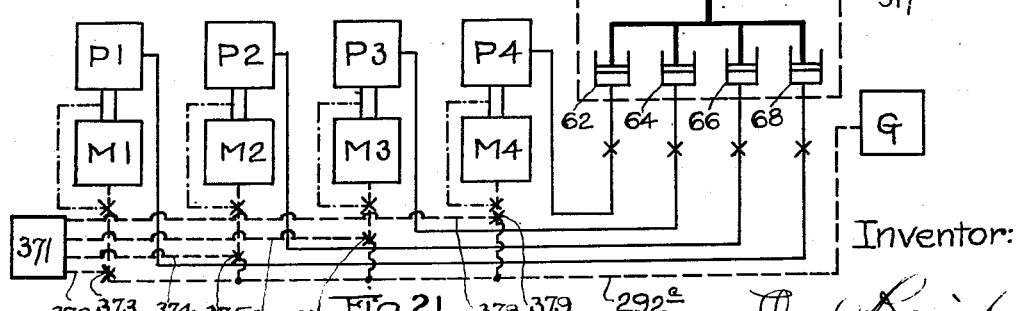

Oct. 2, 1951     T. A. BANNING, JR     2,569,444
PROPELLER PITCH CONTROL
Filed Jan. 18, 1945     8 Sheets-Sheet 7

Inventor:
Thos. A. Banning Jr.

Oct. 2, 1951     T. A. BANNING, JR     2,569,444
PROPELLER PITCH CONTROL

Filed Jan. 18, 1945     8 Sheets—Sheet 8

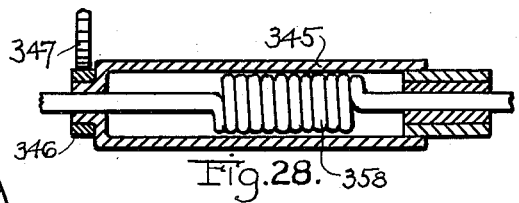
Fig.28.

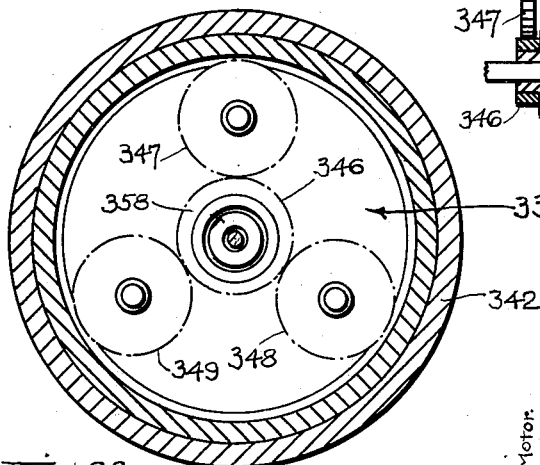
Fig.26.

Key:
A: Traction vs. Pitch angle.
B: Traction vs. Sleeve Travel.
C: Spring force vs. Sleeve Travel.
D: Total force vs. Sleeve Travel.
E: Pitch angle vs. Sleeve Travel.
F: Gear angle vs. Sleeve Travel.
G: Sine gear angle v. Sleeve Travel.
H: Gear torque vs. Sleeve Travel.
I: Motor Saturation vs. Current.
J: Motor Torque vs. Current.
K: Motor Current vs. Sleeve Tr.

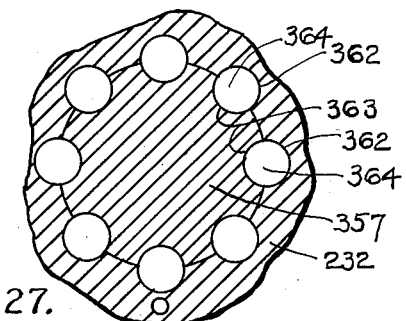
Fig.27.

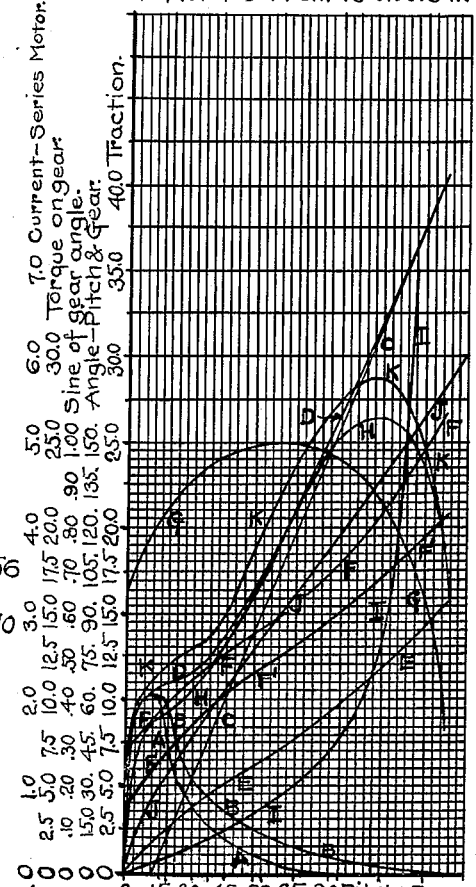
Fig.31.

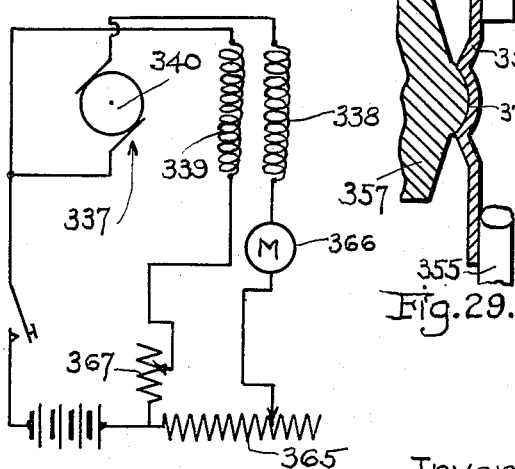
Fig.30.    Fig.29.

Inventor:

UNITED STATES PATENT OFFICE 2,569,444

PROPELLER PITCH CONTROL

Thomas A. Banning, Jr., Chicago, Ill.

Application January 18, 1945, Serial No. 573,382

14 Claims. (Cl. 170—160.13)

This invention has to do with controlling the pitches of blades and other functions of multi-motored airplane propellers, and similar functions. The invention also has to do generally with the controlling of functions of variable multi-grouped units, as will hereinafter appear. Specifically, however, said improvements have been devised with regard to the conditions and requirements in connection with variable pitch multi-motored airplanes such as large bombers, transport planes and the like, and I have illustrated and shall describe such application of the features of my present invention; but in so doing I wish it understood that I do not thereby intend to limit my improvements nor the protection afforded for their use, except as I may do so in the claims to follow. With the above in mind I shall first mention certain operating conditions in connection with such variable pitch multi-motored airplanes, in order that objects and purposes of my invention and its features may be better understood.

The pull or "bite" which is exerted by the blades of a propeller depends on the pitch at which said blades are set, as well as the rotative speed, other factors such as size, form of blades, etc., remaining constant. In multi-motored airplanes means have heretofore been provided for varying the blade pitches, such pitch control being individual to each propeller. Said pitch variation has therefore been individual to each propeller; and the pulling efforts of the several propellers have been more or less non-synchronized, that is, not controllably related to each other. Even when the controls of pitch variation for the several propellers have been interconnected, there has not been assurance that all the blade pitches of all the propellers would be the same at any given time or condition of the controls. It is an object of the present invention to provide means whereby, if desired, there will be definite assurance that the pitches of all the propeller blades will be the same for any selected condition of adjustment of the manual controls.

In connection with the foregoing it is a further object of the invention as a detail to provide hydraulic or fluid means for effecting the blade shifting and adjustments of the propeller blades, suitable valve means being provided for controlling the admission and discharge of the liquids for shifting the blades of the several propellers. Generally such fluid means is operated by use of a suitable composition of oil or oils, in well understood manner.

In connection with the foregoing mentioned objects it is a further object of the invention to make provision for actuating all of the blade shifting devices for the several propellers either as a gang or individually, as desired; or in other cases for selecting two or more blade shifting devices of a larger group and treating them in gang, operating the other non-ganged devices individually. In other words, this feature and object has to do with provision of a fully selective arrangement, whereby the pilot or operator always has it fully in his control to select and group the several blade shifting devices according to his desires, or according to the necessities of the occasion, due, for example to disablement of one or more shifting devices in service, as by enemy fire. In this connection I have provided valve means for controlling the delivery and release of operating fluid to the severel blade shifting devices, whereby each of said devices is individually controlled; together with gang means for joining together any selected ones of said controlling valve means, leaving the others for individual actuation.

A further object of the invention relates to the provision of means for delivering actuating fluid to the several blade shifting devices directly from a suitable source of such actuating fluid under pressure.

Sometimes it may be desired to provide means for actuating the blade pitches according to total power being developed by the several power-motors. In such case I have also made provision for automatic control of the blade pitches as a group, and according to the variations of power supplied by such group.

A further feature and object of the invention is to make provision for control of the pitches of the propeller blades for any kind of craft, either air or water borne. A further feature is to make provision for subdivision of all the propellers of a multi-motored airplane or other craft into groups which may be separately controlled for various purposes. For example, in the case of a four-motored airplane, with two propellers to each side of the medial line of such plane, it may sometimes be desirable to so adjust the propellers at one side of such medial line as to exert a greater pull than those to the other side of such medial line, in order to assist in executing rapid turns, and for other reasons in connection with maneuverability of the airplane. I have made such provision in the present case.

Sometimes, also, it may be found desirable to be able to reverse one or more of the propeller pitches, in order to exert a braking action thereby. I have made provision for such action herein.

The use of double propellers, that is, propellers wherein two blade sections are rotated on a common rotative axis, one behind the other, and rotating in opposite directions, is known. A further object of the invention is to make provision for control of the blade pitches of such section, either independently or together, as desired for best operation at the time.

A further feature of the present invention concerns an improved method of synchronization and the means provided to make the same effective. It is here noted that the pull (or push) of the blades of a rotating propeller (or other moving airfoil) on the body of air (or liquid) within which it is moving is dependent on speed of displacement of such blade or blades or airfoil with respect to such body of air (or liquid) and also on the section of such blade and the angle of attack. In the case of a propeller blade the angle of attack is determined by the form of the blade (measured radially along its length) as well as its "pitch"; and since it is universal practice to so form the blade as to present a varying surface along its length (radius) commencing with a steep angle near the hub or stub and lessening to a small amount at its tip, it is customary to entitle the "pitch" of the blade as a whole, as that "pitch" at some specified point, generally 75% of its full radius. The variable pitch blade scheme then makes provision for rotating the blade or blades on its or their radial axis. As this "pitch" is increased the pull or reaction on the surrounding body of air increases to a maximum for a pitch of 12–15% (degrees) (from the direction of engagement with or meeting the air stream), and then decreases for greater "pitches."

With well designed and fabricated blades of equal size and specifications the reactions of all blades of a series of propellers of a given airplane will be substantially equal for equal rotative speeds, and for equal blade "pitch" settings; so by synchronizing the speeds of such propellers which have been set to the same pitch, it is possible to ensure equal pulls (or pushes or reactions) for all the propellers on the body of air (or liquid) within which the structure is functioning.

It is therefore a further object and function of the present invention to provide, in an airplane (or other vehicle), of the multi-motored, multi-propeller type, means to effect synchronism of speed of the several power-motors and their propellers, and also means to effect synchronism of blade settings of the several variable pitch blade propellers; and to make provision for definite assurance that all the blade pitches will be brought to and held at the same values, as well as assurance that the several units will be brought to and maintained at synchronism of speed. And it is a further object to accomplish these results in combination with many of the objects and results herein elsewhere stated.

Another feature of the present invention relates to the provision of a new type and construction of propeller hub and blade shifting device. In this connection I have provided an arrangement wherein the traction or pull of the propeller in service may be used for securing blade angle change, under control of the pilot. In this connection, also, the arrangement is such that the traction or pull of the propeller tends to set the blades to a lesser pitch angle, that is, towards the low or zero-pitch position, such tendency being resisted by the control device of the pilot.

In connection with the foregoing it is a further object of the invention to make provision for automatically maintaining the pitch of the blades at that degree required to maintain a predetermined amount of pull or traction, so that once such amount has been pre-set by the pilot, the propeller blade pitches will constantly adjust themselves to maintain that traction or pull irrespective of changing conditions of atmosphere, speed of propeller, icing, etc. In this connection it is a further object to so arrange the parts that the shifts necessary in the operation of the blade shifting devices will be greater, per degree of shift, for angles such as are normally used, for example, from zero to fifteen degrees' pitch, than for other less frequently used angles of pitch. This will make the operation of the device more stable than otherwise.

A further feature is to provide a form of hydraulic pitch control and variation device which may, if desired, be locked in any given pitch angle, under control of the pilot.

It is a further object to provide a very simple form of blade pitch control device, one which may be build very sturdy and rugged in construction, one which will not readily get out of order, and one which is well adapted to carry the large forces generated in operation, and transmit them properly between elements intended to receive them.

A further feature relates to the provision of a speed control feature in connection with the blade shifting devices wherein, if desired, the speed of rotation will automatically readjust the blade pitches to new positions.

A further feature of the invention relates to the provision of electrical or electro-magnetic means to shift or control the blade pitches, in place of hydraulic means. Sometimes this electromagnetic means takes the form of a rotary armature element, and sometimes it may take the form of a direct acting or plunger element; but in either case the strength of the current, as controlled by the pilot, will determine the traction or pull to be exerted by the propeller, and in either case the blades may set themselves to maintain the traction or pull as thus predetermined by the pilot.

In connection with the foregoing it is an object to provide very simple structures embodying these features; ones which will require only one or two wires for control thereof; ones which will provide for well balanced forces and stresses; one which will ensure maximum control movement at the critical portion of the characteristic curve of the blade pitch traction relation, so as to be able to secure accurate and stable adjustments over the critical portion of such characteristic curve; one which will ensure a very compact design and relationing of the necessary parts; and one which will present other advantageous features.

A further feature and object is to provide improved means in the form of a torque transmitting ball clutch for transmitting the power torque from the power motor to the blade carrying sleeve, so designed and arranged that these parts may move relatively to each other axially while transmitting the large torques imposed on them, and with a minimum amount of frictional resistance.

It is a further feature and object of the invention to provide means to secure constant pull or traction by a simple form of pilot setting, which pull or traction will be effectively maintained automatically irrespective of variations of speed, and other factors, within the limits of the plant in question. Further, in this connection to provide for such constancy of pull or traction, treating the several power motors as a group, so that the total pull or traction will be effectively maintained, irrespective of variations as between the several units of the group; or even in case of complete cutting out of any one or more power motors of the group, always, of course, within the capacity of the power plant in question. If, for example, it is desired to maintain a total pull or traction, at a given flight speed, of, say, four thousand pounds, in a four motored plant, I have provided means whereby that total pull or traction will be effectively maintained, irrespective of the number of said power motors in service, within the capacity of said power motors. If, for example, one of them should go out of service, the arrangement is such that the remaining units will each be called on to deliver thirteen hundred thirty-three pounds pull or traction, instead of one thousand as previously.

This feature will be of value in various applications. For example, in the case of glider towing, wherein it is necessary to maintain a given pull of the power plane, that pull will be maintained to keep the several gliders of the train in flight, and at the desired conditions of pull as previously established.

A further feature of the invention is to provide blade supports such that vibrations, especially of a torsional nature, will be effectively damped, thereby reducing the dangers attendant on creation and existance of such vibrations.

It is a further feature of the invention that slight leakages of oil under pressure at the locations of the blade shifting elements will not interfere with normal functioning thereof; such result being obtained due to the fact that the blade settings and controls are effected by oil pressures which are controlled and maintained by the pilot's control device.

Broadly speaking, also, it is an object of my present invention to provide blade pitch controls wherein the pitches are controlled by back and forth shifts of the blade stubs along the hub, or vice versa, shifts of the hub with respect thereto, to effect changes or corrections of blade pitch angles, etc. Manifestly, also, such shifts may be of a nature tending to either decrease or increase pitch under the force of the traction or pull of the blades themselves; although in the drawings herewith shown the traction or pull tends to reduce pitch as a specific embodiment of the invention.

In connection with the foregoing it is a further object of the invention to make provision for at all times maintaining the proper pitch of the propeller blades, taking account of the speed of rotation and air speed momentarily in effect. In this condition, to also maintain the desired "bite" on the air wherein the airplane is in flight.

In the drawings:

Figure 3 shows a side elevation of a typical propeller hub construction embodying certain additional features of my present invention;

Figure 4 shows a top or plan view corresponding to Figure 3, one, only, of the blade stub supports being shown;

Figure 5 shows a section on the line 5—5 of Figures 3, 6, 9 and 10, looking in the direction of the arrows;

Figure 6 shows an end view corresponding to Figures 3 and 4;

Figure 7 and Figure 8 shows two views similar to that of Figure 5; and in Figure 5 the blade is in its "Zero-Pitch" position, in Figure 7 it is in its "Full-Traction" position, and in Figure 8 it is in its "Full-Feathering" position;

Figure 9 shows a longitudinal section on the lines 9—9 of Figures 4, 5, 6, 7, 8 and 10, looking in the direction of the arrows;

Figure 10 shows a cross-section on the lines 10—10 of Figures 3, 4, 5, 7, 8 and 9, looking in the direction of the arrows;

Figure 11 shows a cross-section on the line 11—11 of Figure 9, looking in the direction of the arrows;

Figure 12 shows a longitudinal section through a typical form of pressure-reducing valve which may be used with the propeller hub construction shown in Figures 3 to 11, for control thereof;

Figure 13 shows a cross-section on the line 13—13 of Figure 12, looking in the direction of the arrows;

Figure 14 shows a set of curves of variation of blade pitch with movement along the axis of rotation of the hub, for several positions of the link pivot;

Figure 15 shows diagrammatically the several elements of the link pitch control arrangement;

Figure 16 shows in outline a typical arrangement for varying position of the link pivot by use of an eccentric;

Figure 17 shows in outline a typical arrangement for securing variation of pivot position of the pink by means of a centrifugal control device, for constant speed control;

Figure 18 shows schematically one set of oil or fluid connections for the propeller design hereinabove disclosed, and wherein several of said propellers may be gang controlled from a single valve;

Figure 19 shows another arrangement, wherein each of the propellers may be individually controlled from its individual valve;

Figure 20 shows another arrangement, wherein both pusher or tractor and puller propellers are provided in two gangs, each being individually controlled by its own control valve; and Figure 21 shows another arrangement wherein the propellers embodying features of the present disclosures may be used in connection with a servo-device such as that hereinbefore disclosed and illustrated.

Figure 22:
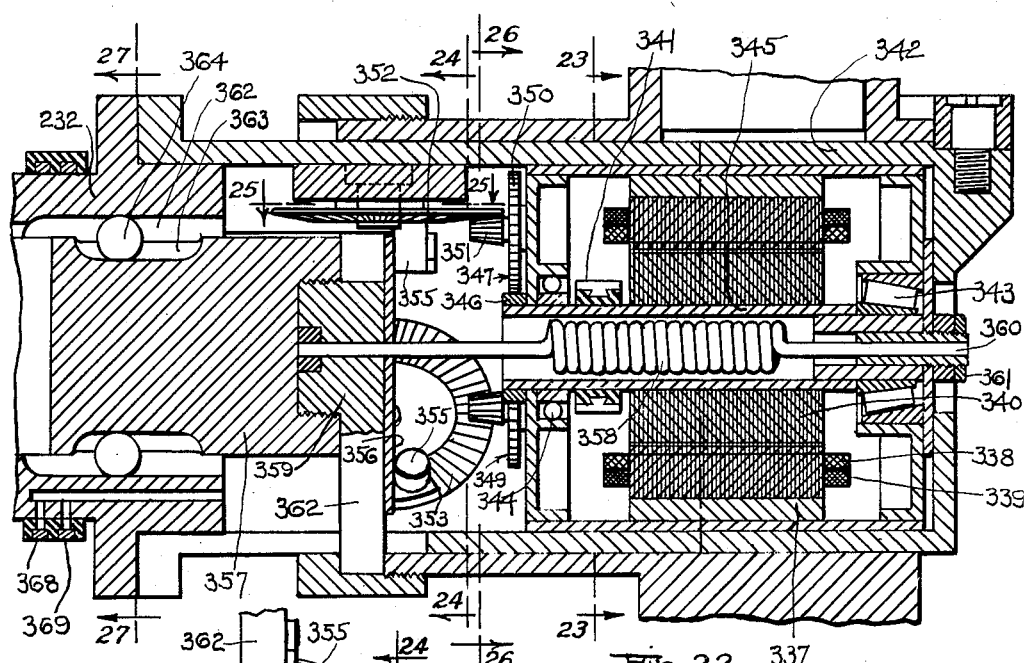
Figure 25:
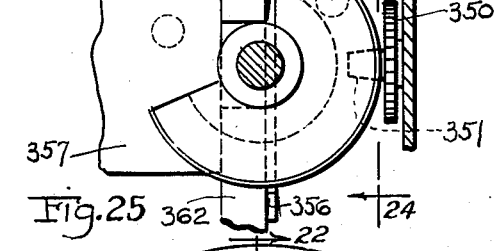
Figure 24:
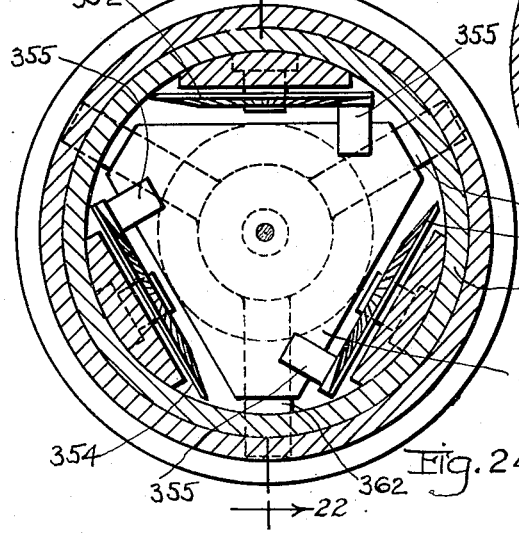
Figure 23:
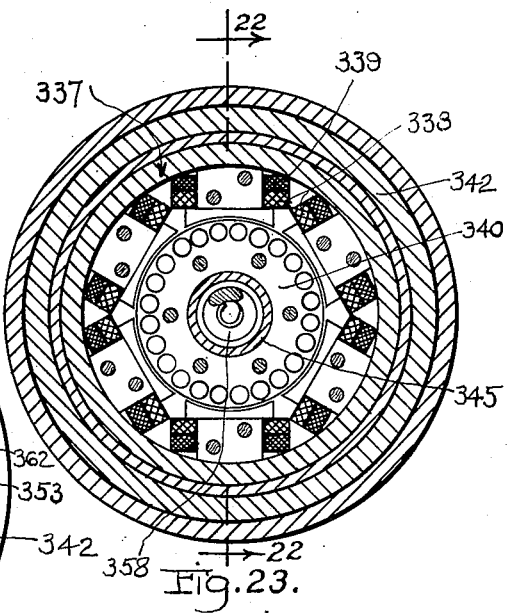

Figure 22 shows a longitudinal section through a modified form of propeller hub embodying features of my present invention, and wherein a rotary electric element is provided for effecting blade pitch control, same including the armature of an electric motor, the current of which is controlled in volume by the pilot's control element, to thereby control the torque of such rotary electric element, thereby controlling the resistance imposed against axial shift of the propeller blades; such modification being in place of the hydraulic means previously disclosed herein;

Figure 23 shows a cross-section on the line 23—23 of Figure 22, looking in the direction of the arrows, and showing the motor element, including stator and rotor thereof;

Figure 24 shows a cross-section on the line 24—24 of Figure 22, looking in the direction of the arrows, and it shows the final gears of the gear reduction train;

Figure 25 shows a detailed section on the line 25—25 of Figure 22, looking in the direction of the arrows;

Figure 26 shows a cross-section on the line 26—26 of Figure 22, looking in the direction of the arrows, and it shows the primary gears of the gear reduction train;

Figure 27 shows a fragmentary cross-section on the line 27—27 of Figure 22, looking in the direction of the arrows, and it shows the details of the ball-clutch whereby torque is transmitted from the power motor shaft to the blade driving element, while at the same time permitting free axial adjustments between these parts;

Figure 28 shows a fragmentary longitudinal section through a modified form of shaft and spring construction of the devices of Figures 22 to 27, inclusive;

Figure 29 shows a further modification of the arrangement of Figures 22 to 27, inclusive, in which the bearing plate may tilt slightly so as to ensure equal pressures against it by all the gear driven elements;

Figure 30 shows a simple wiring diagram of the scheme of Figures 22 to 29, inclusive, whereby the pilot may control pitch by control of current volume supplied to the blade shifting device, with suitable indications of pull or traction, etc.;

Figure 31 shows a series of curves showing the relationships of the several factors and forces acting in the embodiments shown in Figures 22 to 30, inclusive.

Figure 1:
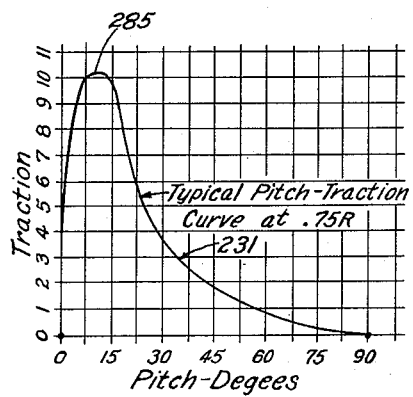
Figure 1 shows a characteristic curve of a typical propeller blade form, showing variation of traction with variation of pitch angle, taken on the .75R position of the blade.

It is a feature of the present invention that the blade pitch devices herein to be disclosed bear a peculiar relation to the forces developed by the blades during operation; and in order that this relation may be properly understood I shall first refer to certain characteristics of these propellers in service. For this purpose reference may be had to Figure 1 which is a typical characteristic curve of variation of traction or pull developed by a given propeller, with change of pitch angle of its blades. Since the blade form is generally one of varying pitch measured from hub to tip, it is common to plot such curves to show the variation on the basis of pitch at .75 radius; and the curve 231 of Figure 1 is a typical curve plotted on that premise. Furthermore, the traction or pull developed by a given propeller will of course depend on the rate of rotation thereof, and the curve of Figure 1 is based on the normal operating speed of the propeller in question.

It will be noted that the traction or pull rises with increase of pitch up to a maximum amount at 12 to 15 degrees, and then falls to zero at substantially 90 degrees pitch. We may assume then that the "Zero-Pitch" position is at zero degrees; the "Full Traction" position is at about 12 to 15 degrees; and the "Full-Feathering" position is at 90 degrees, that is, head on in the direction of plane travel. It is also noted that traction rapidly rises from zero degrees to about 12 to 15 degrees, and then falls again rapidly for about 15 degrees with a reducing rate of such fall.

In my improved propeller construction now to be disclosed I mount the blades with respect to the hub in such manner that they can be rocked on their respective axes to shift their pitches; and I provide means to effect such rocking, said means being under control of the pilot or engineer, and of a nature such that the force tending to shift and increase pitch may be adjusted by the pilot to that amount which he predetermines (or automatically), the arrangement being such that change of traction developed by the propeller will automatically readjust the pitches of the blades to a new point where the traction developed will be that which was predetermined and pre-set by the pilot. Such change of traction might occur due to any one of various conditions, such as change of propeller speed, change of atmospheric condition, icing, or various other conditions; but with this improvement the blade pitches will be automatically readjusted to maintain the traction developed at the amount pre-set by the pilot.

Reference may now be had to Figures 3 to 11 inclusive wherein I have shown a typical propeller hub construction embodying these features, as well as others, the construction therein shown being for a puller or front placed or tractor propeller. These features may also be embodied in pusher propellers, as will be readily seen from examination of the construction now to be described.

The end portion of the engine shaft is shown at 232. This may be either the engine shaft proper or may be gear driven from the engine shaft as desired. Secured to this shaft end is the hub member 233, for which purpose the adjoining ends are flanged as shown at 234 and 235 so that they may be secured together in suitable manner. The hub member 233 is hollow to its closed outer end 236; and a collar 237 is slidingly mounted on such hollow hub. This collar carries the radially extending blade stub receivers 238, 239 and 240, three being shown by way of illustration only. The blade stubs are shown at 241, 242 and 243; and these are shown as provided with the annular outwardly facing shoulders 244 which engage with corresponding reversely facing shoulders of the stub receivers to prevent possible out-throw of the blades during running. In the form shown I also provide a ball bearing 245 around the stub adjacent to the outer end of each retainer; and a thrust roller bearing 246 is placed around the inner end of each stub to normally take the centrifugal force created by the rapid rotation of the propeller. In case of emergency the shoulders 244 will prevent out-throw of the blades, but normally the roller bearing takes the force of the centrifugal operation, and the ball bearing retains the blade stub in alignment. Thus the blade stub may be easily rotated for pitch control.

The inner end of each blade stub is squared as shown at 247, and a circular plate 248 is pinned thereon by an ample cross-pin 249, so that during running this circular plate bears against the inner race-way of the roller bearing to transmit thrust thereto. This circular plate 248 has at one side an extension 250 which constitutes a crank arm, as will presently appear. A link 251 has its inner end pinned to such crank arm by the pin 252, and said link extends out from the stub retainer to a position adjacent to the end of the hub member 233 where said link is pivoted as shown at 253. It will now be seen that since the collar 237 is slidingly mounted on the hub member 233 so that it can shift back and forth, such shiftings will cause the blade stub to rock with a movement dependent on the extent of sliding movement, the proportions of the crank arm and link lengths, and other factors as will be readily apparent.

Within the hollow hub there is slidingly mounted the plunger 254 having the rod 255 which reaches back towards the engine, and said rod 255 is hollow so that oil or other fluid may be placed under pressure against the outer face of the plunger by communication through said hollow rod 255. Said rod 255 works into the passage 256 of the engine shaft 232 with an oiltight fit, preferably sealed by the gland 257; and communication is established between the passage 256 and the outside of the engine shaft by means of the stationary collar 258 having the internal groove 259 communicating with the outwardly extending opening 260 from the passage 256. Thus pressure exerted against the front face of the plunger 254 is controlled from outside the structure and by connection to the collar 258. Such connection is established by the nipple 261.

Now it will be seen that during normal running of the propeller the traction or pull thereof is towards the right in Figure 9 so that oil pressure built up against the front face of the plunger resists such traction, and by setting the oil pressure at a given or predetermined amount the traction which must be generated by the running of the propeller to cause shift towards the right in Figure 9 may be pre-set. It will also be seen that back and forth movements of the propeller hub and blade stubs are necessarily accompanied by shifts of blade angle or pitch of the blades, due to the link connections already explained.

It is intended that the parts shall be so proportioned that normal tractions exerted by the propeller may be resisted by the oil or fluid pressure with reasonable pressures such as fifty to one hundred pounds per square inch, but the exact proportions will be a matter of individual design. It is furthermore noted that the amount of shift of the hub member 233 accommodated is sufficient to permit full throw of the blades from "Full-Feathering" to "Zero-Pitch," being a throw of substantially ninety degrees. It is also noted that the parts should generally be so arranged that when the hub member 237 is in its full forward position the blades are in the "Zero-Pitch" position, and that when the hub member is shifted full backwards the blades are in their feathering position, a rock of substantially ninety degrees. In Figure 5 the parts are shown in the "Zero-Pitch" position, as shown by the arrow 262, and the crank 250 lies somewhat back of the radial line; in Figure 7 the parts are shown in the "Full Traction" position, the arrow 263 showing a tilt of substantially fifteen degrees or slightly more (rotation being clockwise when viewed from in front of the propeller), and the crank arm 250 is at substantially right angles; and in Figure 8 the parts are shown in the "Full-Feathering" position, as shown by the arrow 264, the crank arm 250 being drawn back to a position somewhat less than parallel to the shaft axis. Thus it will be seen that from the position of Figure 5 to that of Figure 8 the blade has suffered a pitch angle change of ninety degrees; and furthermore, during such rocking movement the crank arm 250 has also suffered a rock of ninety degrees, but at no time has such crank arm been in a dead-center position with respect to the link 251 and pivot pin 253, so that shifts have at all times been readily effected. It will also be seen that such shifts of blade pitch have been effected merely by back and forth sliding of the sleeve 237 on the hollow hub. It is furthermore noted that the arrangement is such that such shiftings are effected in such manner that the tendency of the traction or pull of the propeller itself is to cause a reduction of blade pitch, since forward movement of the sleeve 237 due to pull or traction of the propeller tends to rock the blades back towards the "Zero-Pitch" position, reducing pitch thereby. It is further seen that such reducing tendency is resisted by the oil pressure against the front face of the plunger 254.

From all the foregoing it is now evident that by setting the oil pressure against the front face of the plunger at a predetermined value by means of a device which will maintain such pressure value while at the same time allowing for oil movements due to back and forth shiftings of the plunger 254, we shall be able to automatically maintain the propeller with a predetermined pull or traction, dependent on such established oil pressure, and any condition which tends to increase the pull or traction will automatically cause the propeller to shift to a position where the blade pitch assumes a value such that said traction is again developed; or vice versa. I have herein illustrated and shall describe in detail one form of fluid pressure control valve which may be set to any selected or adjusted pressure valve position and which valve will then maintain such pressure on the delivery line leading to the face of the plunger 254, and which valve will allow the fluid to flow through such delivery line to and from the face of such plunger to accommodate for movements of the plunger back and forth while maintaining such pressure value constant. Such a form of valve is shown by way of illustration in Figures 12 and 13 of this case. It is, however, to be noted that in case it is desired to maintain the blade pitches at a given value irrespective of pull or traction being developed, this result may be secured by forcing oil into the cylindrical space before the plunger 254 and locking said oil therein, to thereby maintain the blades at the predetermined pitch and without allowing them to shift back to a condition of lesser pitch.

It is also noted that this arrangement is such that the tendency of the pull or traction is always to reduce pitch, and that the total force which must be resisted by the pressure of the oil against the plunger face is equal to the total traction or pull being developed by the propeller. Also, that the traction or pull of the propeller is transmitted to the hub for transmission to the airplane, through the medium of the oil and plunger arrangement. This result is secured as follows;

The plunger rod 255 carries a collar 265 having the outwardly extending arms 266, 267 and 268, which reach through the slots 269, 270 and 271 of the hub member 233, and the outer ends of these arms are received in notches 272, 273 and 274 of the collar 237. The ring 275 is threaded onto the end portion of said collar to retain said outer arm ends in place in such notches, and to lock the parts together. It is here noted that for purposes of assembly the ring 275 is also provided with notches 276, 277 and 278 which will pass the outer ends of the arms during assembling of the parts; but said ring should then be brought to a final position of rotation such that the outer ends of the arms are locked in position as shown in Figure 11, in particular. It is thus seen that these arms perform two functions; they transmit forces of rotation from the hub member 233 to the blade stub receivers, and thus drive the blades; and also they transmit pull or traction forces from the blades to the hub member, and thus secure the transmission of the traction or pull to the airplane; and all these results are accomplished while also permitting the blades to set themselves back and forth to automatically adjust their pitches as above shown.

As a matter of design and to permit assembly of the parts, I prefer to split the blade stub receivers, one portion 279 of each of them comprising a portion of the collar 237; and the other portion 280 of each of these blade stub receivers being secured in place by suitable means such as screws or the like. Preferably, also, such splitting is effected on a plane normal to the axis of propeller rotation, as shown in the several figures. Furthermore, a collar 281 may be threaded onto the outer ends of these split portions to further assist in holding them together.

In Figure 9, in particular, I have shown the Sylphon 282 placed within the cylindrical chamber of the hub member 233 and in front of the plunger, and a tubular extension 283 of this Sylphon is carried through the hollow rod 255 to its rear end where it may be brazed or otherwise sealed thereto. Use of such a Sylphon arrangement will provide a perfectly oil tight construction, and one which can be readily assembled. In the absence of such Sylphon arrangement the plunger 254 may be provided with the piston ring 284 of suitable form for sealing.

Now in the operation of this scheme it is intended that oil or other fluid pressure should be exerted in the space in front of the plunger in amount according to the traction or pull which it is desired to exert by the propeller, so that upon bringing the propeller into operation it will commence generating traction, which will increase with speed or until the condition of balance is found. Or, the propeller may be first brought to speed without creation of such pressure against the front face of the plunger, so that the generation of a slight amount of traction or pull by the propeller rotation will set the same forward substantially to the zero-pitch angle position where substantially no traction will be developed even at speed. Then, by building up the oil or other fluid pressure the propeller will be successively forced back to a condition of balance dependent on such pressure so established, or dependent on the position at which the propeller is locked.

Reference to the curve of Figure 1 shows that the maximum traction which will be developed (under selected conditions of speed) will be attained long before the position of 90 degrees is reached; and in case of operation at or near the peak 285 of such curve it is evident that reduction of traction (pressure) might be accomplished either by reduction or increase of pitch. Thus, if we should be operating near such peak position, with the oil pressure sufficient to maintain the pitch at the corresponding degree position, a reduction of such oil pressure might result in increase of pitch rather than decrease thereof, as desired. To prevent such a condition, and for other reasons, I have provided behind the plunger 254, one or more springs whose accumulated strength is sufficient, at the proper time, to ensure that the collar 237 and blade stub receivers, will always be returned to the lesser pitch condition upon reduction of oil pressure. These are the springs 286. They occupy positions between the back face of the plunger and the front end of the shaft section 232.

Figure 2:
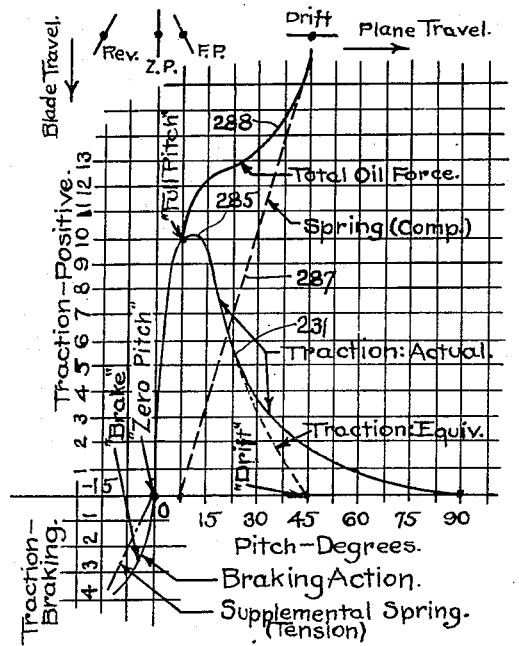
Figure 2 shows another set of curves, including that of Figure 1, and also showing the effect of use of a spring for assisting the restoring movement of blades in a certain typical form of blade pitch control device.

Now it will be seen that the force of these springs must be overcome in addition to that of traction or pull exerted by the propeller blades, in order to maintain the collar 233 at any given position, so if the effect of these springs is exerted prior to the time the peak of the curve 237 is reached (Figure 1) such force must be added to that of traction, in setting the blades to a given pitch position. But the effect of these springs is not generally required until at or near the peak condition. Therefore I prefer to so set these springs, and to use springs of such characteristics, that they will not come into operation until the plunger has moved back a distance sufficient to create the corresponding pitch condition of the blades. This may be done, for example, by so forming these springs that they are fully extended at or about the time the plunger stands at a position slightly prior to reaching the peak condition, so that further plunger movement to the left (Figure 9) will cause compression of the springs so that their effect will be added to that of traction or pull of the blades. Furthermore, from that time on it is noted that the effect of such springs should be to require a continuously increasing pressure from the plunger, so that the additive effect of springs and traction or pull of the blades will always be to cause a rise of their additive curve. Thus, in Figure 2 I have repeated the curve 231; and I have also shown by the curve 287 the effect of the spring or springs. Their cumulative effect is shown by the curve 288 which rises continuously from a position near the peak 285 to a still ever higher position, so that as the plunger continues to move to the left beyond the peak position the curve will continue to rise. By this means there is assurance that when the plunger is forced beyond the peak position it will, when the oil pressure is again reduced, move back towards the lesser pitch condition, instead of continuing on over to the "Full-Feathering" position from which it could not otherwise be brought.

Furthermore, this arrangement assures return of the blade pitch shifting devices to a lower pitch condition without any effect of the springs during normal operations, since these springs do not come into operation until at or near the peak position 285.

Reference to Figures 18, 19, 20 and 21 will show certain schematic arrangements for connecting up the blade shifting device thus disclosed. Thus in Figure 18 all the blade shifting devices are connected up in "parallel" by the line 289, receiving pressure oil from a suitable source 290 through the reducing valve 29ª having the handle 292; and return oil from such reducing valve is delivered over the line 293ª to the return container 294, from which it is again drawn by the pump 295 and placed under pressure in the container 290. With this arrangement the pressure of oil on the line 289 may be set at a selected amount, which will be that delivered to all the propeller blade shifting devices, so that they will all be compelled to set their blades for the same traction or pull. If desired, cut out valves 291 may be provided in the lines leading to the individual blade shifting devices, so that any one or more of them may be cut out as desired.

In this arrangement, also, I have shown a common fuel supply line 292ª supplying all the motors, through a metering device 293, and a connection 294 is shown from such metering device to the pressure reducing valve 291ª so that the operation of such reducing valve may be effected automatically according to rate of fuel supply to the group of motors. Thus the blade pitch adjustments will be effected automatically and according to total power which is to be maintained in the group of motors. I have also shown the speed control connections 295ª from the several motor shafts 296 to the several motor throttles 297 so that the various motors will be, if desired, speed controlled also. I have also shown the speed synchronizing connections.

In the arrangement of Figure 19 I have shown individual pressure reducing valves 298, 299, 300 and 301 for the several blade speed control shifting devices. In Figure 20 I have shown an application of the features of my present invention to an airplane having both puller or tractor and pusher propellers, being the two groups 302 and 303, respectively, these groups being individually served by the speed control pressure reducing valves 304 and 305, respectively.

The details of a pressure reducing valve suitable for use in any of the foregoing schemes are shown in Figures 12 and 13. In this case pressure oil or fluid is received into a casing 306 through the connection 307, return oil being delivered from such casing by the connection 308. The connection 309 between said connection 307 and 308 extends to the blade shifting device to be controlled. There is a balanced valve plunger 310 in the casing, having the encircling groove 311 of some axial dimension; and an adjustable spring 312 tends to set this plunger 310 over towards the right or pressure receiving position (Figure 12). There is a pressure balancing port 313 extending through the plunger to its right end so that whatever pressure exists in the groove 311 (and therefore in the line connected to the port 309) will be exerted against the right hand end of the plunger, tending to set it back to the pressure closing position (being also towards the pressure relieving position). The force of the spring 312 may be adjusted by turning the double-threaded screw plug 314 by the handle 315, a ball bearing 316 being introduced into the connection to ensure easy operation.

It will be seen that with such a reducing valve as that just disclosed it is possible to maintain the pre-selected pressure against the face of the plunger 254 of the blade shifting device, as movements of said plunger may take place back and forth, but always with the maintainance of the pre-selected degree of oil pressure against the plunger face.

In Figure 21 I have shown an arrangement wherein the oil pressures exerted against the several plungers 254 of the several blade shifting devices may be adjusted, and also wherein said devices will be locked in any given adjusted position. To this effect I have shown a servo-device at the position 317, the several cylinders 62, 64, 66 and 68 (small) of such device being individually connected to the blade shifting devices by the lines shown in Figure 21, and the large or power cylinder 87 of such servo device being supplied with oil of pre-selected or reduced pressure by means of the reducing valve 318. This scheme will ensure movement of the several blade shifting devices all to the same degree of pitch, and the presence of the single or gang pressure reducing valve 318 will ensure constancy of total pull (or push) exerted by the gang of propellers in case of use of such a propeller scheme as that of Figures 3–11, inclusive, or some equivalent scheme.

In Figure 14 I have shown by the curve 319 the variation of pitch angle of the blades, with variation of plunger position (plunger 254) along its travel, for the location of the pivotal point 253 as shown in Figures 4 to 10, inclusive. By shifting this pivotal point the form of this curve may be changed, so that for a given or selected plunger location the pitch will be changed. Such changed pivotal positions are shown at 320, 321, 322 and 323 in Figure 15, for four positions of the pivotal point; and corresponding curves 324, 325, 326 and 327 are shown in Figure 14. It will be seen that by such a shifting of the pivotal point very extensive changes of pitch for a given plunger position may be secured, thereby in effect changing the calibration of the device in service.

In Figure 16 I have shown as a modification an eccentric arrangement for supporting the pivotal point 253, including the rockable eccentric 328. By placing a bell-crank 329 on the blade stub support at a suitable pivotal point 330, with the centrifugal weight 331 on one arm of such bell-crank, and the other arm of such bell-crank connected to the eccentric sleeve, 332, it is possible to secure automatic shifting of the blade pitch device with speed, to compensate for variation of push or pull with speed, and even when the plunger 254 is locked as by the scheme of Figure 21. In this scheme I have also provided the spring 333 which tends to resist the centrifugal action of the weight; and suitable stops 334 and 335 are provided to limit the movements of the weight and bell-crank in the two directions of movement.

In connection with the scheme shown in Figure 21 it is noted that there is not a completely locked condition to absolutely prevent any movement of each of the blade shifting plungers 254 under the force of push or pull exerted by the propeller; but due to the fact that the power cylinder of the servo-device is much larger than each of the small cylinders thereof it is evident that the force which would be required to force back the power cylinder is multiplied, so that there is in effect a locking action with this scheme. An absolutely locked condition might be attained by provision of a modified form of the control valve 318 which would prevent back flow of oil except under release of the operator.

It is thus evident that the variable pitch propeller construction herein disclosed is such that it may be used either with control such that it will automatically maintain the blade pitches at adjusted amount to develop a predetermined push or pull, as in the case of use of this device with a pressure-reducing valve such as that of Figures 12 and 13; or this variable pitch propeller may be used in schemes wherein it may be set to a desired pitch and then locked at such setting, irrespective of the push or pull being developed.

It is furthermore evident that when using a pressure-reducing valve of the characteristics of that of Figures 12 and 13 this variable pitch propeller will automatically vary the pitch of its blades to maintain the push or pull at that amount which will balance the pressure-predetermined by the pilot, such action being secured by the back and forth shifting of the collar 237 with corresponding shift of blade pitch; and it is also evident that in case of use of a "locking" scheme wherein the back flow of oil is prevented, automatic shift of the blades may be secured to maintain a constant speed of the propeller, by use of a governor arrangement such as that of Figures 16 and 17 to shift the pivotal point of the link.

It is further to be noted that although the particular device illustrated in Figures 3 and 11 is designed to provide for blade shifting between the conditions of "Zero-Pitch" and "Full-Feathering", or ninety degrees blade shift, still devices embodying my present invention might be readily designed to make provision for shift to a reverse position, that is, backwardly from the "Zero-Pitch" position to thereby provide for braking actions, as previously mentioned herein.

It is a distinctive feature of this improved propeller construction that the blade stubs are carried or mounted in such a manner that they may shift back and forth axially of the drive shaft with provision for variation of pitch according to such shift; and also that the force of push or pull developed by the rotation of the propeller tends to always shift the blades forward towards a lesser degree of pitch; and furthermore, that the oil pressure balances the push or pull developed by propeller rotation. Furthermore, that the arrangement is such that a single oil line is sufficient to provide for complete control of the pitch conditions from a distance. Also, that I have provided force means acting in the direction of traction produced by rotation of the propeller and supplemental to said traction and tending to reduce blade pitch.

Now, reference to the curve of Figure 1 shows that the usual working condition of the blades is at some angle between zero pitch and substantially twelve to twenty degrees therefrom, depending on the blade design and other factors. Still I have made provision for complete rock to the drift position, so that in certain cases, as for example in case of shutting off a motor and when it is desired to drift the airplane with as little interference from the dead propeller as possible this result may be accomplished. It will also be noted that the link arrangement for securing pitch variation is one which gives a variable rate of pitch change for equal movements of the collar 237 along the shaft, and I have availed myself of this fact to make provision for securing greater stability in the settings of the pitch control, by so designing the arrangement that more rapid changes of pitch angle occur with specified amounts of collar movement at the high angle positions than at the low angle positions. This fact is emphasized from examination of the curves of Figure 14. Manifestly by other detailed designs an even greater emphasis of this benefit might be attained. Furthermore, the shifting of the angle of the blades with bodily shift along the axis might be attained by other schemes than the crank and link scheme illustrated, as for example, use might be made of a rack and pinion arrangement, the rack being on the driving member 233, and the pinion being on the stub of each blade. With this scheme it would also be possible to secure a variable rate of change of pitch angle by use of a specially designed form of rack and pinion combination.

It is also evident that the features herein disclosed may be used equally well for propellers of either the pusher type, or the puller type herein illustrated; so I do not limit myself to the puller type, except as I may do so in the claims to follow.

The following comments are in order with respect to the propeller construction and control shown in Figures 3 to 21.

Since the tendency of the blades is to shift themselves forwardly due to their own action on the air, if such a propeller be brought to speed (not necessarily full speed, but sufficient to develop push or pull), with the oil or fluid pressure against the front face of the plunger 254 either zero or relatively low, it is evident that such propeller will shift its hub forwardly to a position where the blade pitch is substantially zero. This would be the condition, for example, when idling. Then, when it is desired to build up push or pull it is only necessary to shift the reducing valve to position for higher pressure against the plunger face, thereby forcing the plunger backwardly and rocking the blades to pitch for greater push or pull. During this time the propeller speed may be full speed or some lower value, or may be of some value pre-determined by a suitable control, such for example as that of my copending application, Serial No. 459,336. Whatever pressure value has thus been set by the reducing valve will determine the blade setting, and the plunger will thereafter automatically adjust itself back and forth from time to time to maintain a balance between push or pull and pressure against the plunger. Thereafter adjustments of pressure under control of the reducing valve or otherwise will be accompanied by corresponding readjustments of the blade pitch so that new conditions of balance will always be found.

It is further noted that with this arrangement the force of push or pull is communicated from the blades to the shaft section 232 through the medium of the oil or fluid in advance of the plunger 254. In other words, the oil or fluid constitutes a body for transmitting the effective force to the airplane itself. The pressure generated in that body is the means whereby the setting of the blade pitch is controlled and readjusted from time to time. Furthermore, new adjustments of blade setting or pitch may be very rapidly executed since re-settings of the reducing valve will at once and very quickly result in re-settings of the plunger with corresponding rapid readjustments of blade angle. Thus it is possible to execute very rapid maneuvers of the airplane which require pitch changes, or when pitch changes would be desirable in connection therewith.

It is further noted that the only pull or other force to be exerted by the links 251 which actually control pitch are those forces which may be due to a condition of unbalance of air pressures against the blades. If the blades are dynamically balanced on their own longitudinal axes, that is, their axes of rock in the bearings 245 and 246, they will stay at any given pitch setting to which they are brought without exertion of force, and under such conditions the links 251 will not be called upon to retain the blades at their pitch settings, once such settings have been attained. If, however, such condition of balance does not exist these links will be called on to retain the blades at the desired pitch settings; but even in such case the force needed to accomplish this result will be quite small, at least in comparison to the force being carried by the oil or fluid pressure against the plunger 254. For this reason it is evident that in design the turning moments which must be provided for to retain the blades in any given pitch setting are small, and can be readily provided for in a design embodying features of my present invention.

As respects the schematic layout of Figure 21 it is noted that a single servo-unit serves to ensure similar or equal pitch settings for all the propellers being served thereby through the medium of a single reducing valve since no propeller blade pitch setting can change therein without corresponding change of the pitch settings of all the other propeller blades. To this extent that scheme departs from the arrangement shown in Figure 18 wherein the single reducing valve serves to deliver oil or fluid to all of the blade shifting devices in parallel, and wherein, therefore, each of said blade shifting devices is free to make its own adjustments independently of the others, but at the pressure dictated by that single reducing valve. In the scheme of Figure 21 the single reducing valve will determine the total push or pull to be developed by all the propellers ganged to it; in Figure 18 each of the propellers will individually develop a push or pull determined by the oil pressure set at the reducing valve of that gang.

It is evident that if desired stops might be provided to limit the backward movement of the plunger 254 so that it could not move to a position sufficiently far to bring the curve 231 over its peak, in which case the springs 286 might be eliminated. Other means might be devised to either limit movement of the plunger or to ensure return of the parts to the "Zero-Pitch" position from the peak of the curve.

Referring again to Figures 18, 19, 20 and 21, the following comments are noted with respect to the operations therein provided for;

In the case of the gang controlled scheme of Figure 18 it is evident that setting of the pressure reducing valve to a given setting will result in maintaining that pressure at all of the blade shifting devices. This will result in the maintenance of the corresponding amount of push or pull at each of the propellers, by corresponding setting of their blades. In case of loss of any given propeller or its motor, as by enemy fire or otherwise, the total push or pull on the airplane will be correspondingly reduced, as each of the remaining motors and its propeller will continue to exert the push or pull dictated by the setting of the reducing valve. This operation would occur in the absence of the metering device for metering total fuel supply to all the motors, which is also shown in Figure 18. By proper connection of this metering device with the pressure reducing valve as shown in that figure it is evident that said total metering device may be so set as to require constant delivery of a specified total amount of power (represented by the rate of rotation of the metering device), in which case the reducing valve will be correspondingly readjusted by the connection from the metering device, to require the remaining propellers to absorb among them the full power for which said metering device was set. For example, if said metering device were set for 8,000 horse-power, and all four motors and propellers were functioning, each would be delivering its quota of such total of 8,000; and in case any given motor or propeller should go out, leaving only the three remaining to take the full power, these would be called upon (if able) to each deliver one-third of the 8,000, or 2,666 horsepower, the airplane still receiving its total of 8,000.

In my aforesaid co-pending application, Serial No. 459,336 I have disclosed means whereby such a metering device as shown in Figure 18 hereof, may be caused to function for maintenance of the pre-determined amount of power, and therefore I do not deem it necessary to make further disclosure of said means herein.

Reference to Figure 21 of the present case shows the use of a servo-device, in connection with all the propellers and blade shifting devices to be controlled thereby. In this case, also, the pressure reducing valve serving the servo-device will maintain a specified pressure against the large or power cylinder of such servo-device, so that this total force must be absorbed by all the small plungers which are connected to it. This means that normally all of the four propeller blade shifting devices served by this large cylinder and its plunger, will take the full load imposed by the pressure (as determined by the reducing valve) and distribute said load to all four of the blade shifting devices, so that each of the propellers will have its blades set to positions for absorbing one-fourth of the total power. In case any motor or propeller goes out, however, this total will be delivered to the remaining three, with consequent necessary increase of the power delivered by each.

It is thus evident that I have herein provided means to maintain total power absorbed by the several propellers constant, and for accomplishing this function and result either by metering the total power or by direct control of the blade shifting devices by a gang control.

Various vibrations of the blades in service occur which are well known. Among these are the torsional vibrations sometimes encountered. These are vibrations of the blades of a torsional nature with respect to their longitudinal axes (which lie radially of the axis of propeller rotation). It is desirable to damp these vibrations should they occur in service. It is here noted that with my present arrangement of support for the blade stubs such damping action is excellently provided for. This is because any rotative tendency of a blade to rotate about its longitudinal axis must be communicated to the link connected to its lower end, and such tendency then results in slight back and forth shift of the collar which carries all the blade stub carriers. The natural period or frequency of such collar for longitudinal or back and forth vibration is very different from the torsional period or frequency of the blade itself, so that a damping action will occur, and torsional vibration of the blade will be at once extinguished. In addition to the foregoing it is noted that since all the blades are connected together in their stub supports, so that they must all move back and forth together with said collar, it follows that any tendency of one blade to vibrate will be more or less damped by any such tendency of another blade to vibrate, so that here again the vibrating tendency of the blades is naturally extinguished as between them.

If desired a block of slightly cushioning material, such as medium soft rubber 336 may be set between the front end of the Sylphon and the front end of the cylinder, so that slight vibrations in oil or fluid pressure will be absorbed thereby to further damp any tendencies towards vibration of the parts in service.

In the arrangement of Figures 22 to 27 inclusive, I have shown the electric motor stator element 337 located within the hub portion of the propeller, said stator element being of the multi-pole type, shown as including six poles. These are excited by the coils 338 (and sometimes the supplemental coils 339, as shown). Within this stator element is the rotor element 340, same being of the direct current, commutator type, and including the commutator 341. The stator element is secured to the hub casing 342, whereas the rotor element 340 is carried by the bearings 343 and 344, the shaft of such rotor element comprising the hollow sleeve 345.

The projecting end of this shaft element carries the pinion 346; and on the end of the housing for this electrical element are journalled the reducing gear elements 347, 348 and 349. Each of these includes the spur gear element 350, and the bevel gear element 351 as a unit. The hub casing carries on its interior the bevel gear elements 352, 353, and 354, meshing with these bevel gears 351, respectively. Each of these bevel gears 352, 353, and 354, carries the inwardly extending stud 355; and there is a pressure plate 356 carried by the end portion of the shaft section 357 by which torque is delivered from the power motor shaft to the hub casing 342. These studs 355 press against this pressure plate to cause backward movements thereof, and to take the axial thrust delivered by the blades during operation. The spring 358 (corresponding to the springs 286 of the previously described construction) extends axially through the hollow shaft or sleeves 345, one end of said spring being connected to the block 359 behind the pressure plate 356, and the other end of said spring being brought to the front end of the structure as shown as 360, where it may be adjusted by the nut or nuts 361 to adjust tension and length of said spring.

The block 359 carries the outwardly extending arms 362 (corresponding to the arms 266, 267, and 268 of the previous construction), by which back and forth movements are communicated between the blade stubs and said block 357; and furthermore these arms transmit the total torque from the power motor shaft to the hub casing 342. I have provided the power motor shaft 232, and the shaft section or block 357 with the companion splines or grooves 362 and 363, wherein are located the balls 364 by which said parts are rotatively connected together, while at the same time allowing for relative axial movements between these parts. These balls will establish very easy riding driving connections, whereby the large torques may be transmitted without creation of excessive frictional resistances, so that the axial adjustments of the stub hub carrying element 237 may be effected while under power by exertion of relatively small forces (to overcome frictional resistance), thus making the device responsive to close controls.

Generally it will be found desirable to use a series motor connection as between the rotor element and the stator element of the scheme of Figures 22 to 27, inclusive. By adopting this type of rotary electric element it will be possible to develop suitably large torques in the rotor without using excessively large currents for control thereof. In some cases, however, it will be found desirable to make provision for supplemental field control for which purpose I have shown the supplemental field coils 339. In Figure 30 I have shown a simple wiring arrangement for this electric control. The field coils 338 and 339, and the armature element are shown in Figure 30 by corresponding numerals; and I have, in that figure shown the variable rheostat 365 which may be adjusted by the pilot for control of current volume being supplied to the electrical blade control unit. A suitable meter 366, reading either in current units, or push or pull, or other suitable units, may be provided in the circuit, to inform the pilot of the setting of the parts. It will be understood that increase of current value will result in increase of torque being developed between the rotor and the stator of the control unit, and thereby increase of push or pull of the propeller blades which will be resisted, and thus the setting of the blades will also be automatically controlled to ensure such push or pull. I have shown the supplemental field coils as being controlled by the rheostat 367; but generally the setting thereof will be of a permanent character, for purposes of original calibration, etc., and not for service use during normal blade control operations.

I have shown the main shaft section 232 of Figure 22 as provided with the two slip rings 368 and 369. These may be used for supply of current to the electric elements, one for the series armature and field circuit (one end thereof being grounded), and the other slip ring being for control of the supplemental field coils 339, whose other ends are also grounded. It is thus evident that with this electrical scheme it is only necessary to provide two simple brush connections for supply of current for all functions.

In Figure 28 I have shown a modification of the scheme of Figures 22 to 27, inclusive, wherein it is possible to bring out the inner end of the spring 358 in such manner as to permit use of a smaller gear 346 than in the former arrangement.

In Figure 29 I have shown a further modification in which the pressure plate 356 is seated against the end of the shaft section 357 by a ball and socket connection 370, permitting slight tilting movements of said plate, so that there will be assurance that all of the studs 355 will exert equal pressures against said plate at all times, notwithstanding the presence of the intermediate gear trains by which said studs are connected to the rotor shaft element.

It is noted that with this electrical scheme it is possible to secure various forms of curves of blade pitch angle as compared to current volume due to the relationship existing between the several elements of the scheme. Thus, as shown in Figure 31, curve "K" shows the relationship between current and sleeve travel, from which it is apparent that relatively large variations of current may be used for control of pitch angles through the range between zero and substantially fifteen degrees, being that range wherein practically all pitch angle adjustments will ordinarily be made. This will ensure possibility of close pitch angle adjustments, and stability of said adjustments in practice.

In Figure 18 I have also shown the speed and synchronizing control unit 391 for the several power-motors of that scheme, same being suitably connected to the several throttles 297 by the synchronizing control lines 392, in suitable manner, as for example by the scheme disclosed in my aforementioned application, Serial No. 459,336. Likewise, I have shown in Figure 19 the synchronizing and control unit 393 acting on the throttles 397, 398, 399 and 400 of the several power motors through the synchronizing control line 394; and in Figure 20 I have shown the synchronizing and control unit 395 acting on the throttles of the several power motors through the lines 396. Thus it is evident that in each of said schematic schemes of Figures 18, 19, 20 and 21 I have shown means to synchronize and control the several power-motor-propeller units for speed, as well as making provision for the other various functional controls already explained herein.

It will be evident that in the various schemes herein disclosed I have made provision for synchronization of various factors which affect the operation of the propellers of the airplane and other ships, etc. Thus, there is provision for synchronization and control of speed, power, pitch, and pull (or push) of the several power-motor-propeller units; and I have in the several schematic arrangements disclosed herein combined these various kinds of synchronization in various combinations. These may be summarized as follows:

In the arrangement of Figure 18 there is synchronization of speed and pull (or push) of the several power-motor-propeller units, together with provision for maintaining constancy of gross power or control thereof;

In the arrangement of Figure 19 there is synchronization of speed and provision for individual controls of the pulls (or pushes) of the several power-motor-propeller units;

In the arrangement of Figure 20 there is synchronization of speed and group synchronization of the pulls (or pushes) of the several power-motor-propeller units; and In the arrangement of Figure 21 there is synchronization of speed and pitches of propeller blades of the several power-motor-propeller units.

Of course it is understood that in all cases manual control may be assumed of any selected unit or units, as has been shown hereinbefore, so when reference is made to gang or synchronous control of a specified function it is to be understood that manual controls in individual units may be assumed as needed.

Now in the case of Figure 21 in which there is synchronization of speed and pitch, if the several propellers are built to close specifications it will be found that for such operating conditions as synchronization of speed and pitch all these propellers will deliver equal pulls (or pushes), so that synchronization of powers is substantially secured, although actually the pitches of the propellers are being synchronized. But it is noted that the "powers" thus synchronized are powers delivered to the moving plane, and not generated powers of the power-motors. The gang control of power provided for in Figure 21 acts on the pitch control mechanism so that there is assurance that when a specified amount of power is to be maintained in the gang of power-motor-propeller units, said total power will be maintained irrespective of cutting out a given unit or units in an emergency, but in all cases there will be maintained the desired synchronism of speed and synchronism of pitch as between the several units, and the pitches will be automatically readjusted from time to time, while remaining synchronized, so as to ensure the delivery of the specified total or gang amount of power, in the arrangement of Figure 21.

In the cases of Figures 18 and 20 there is provided synchronism of pull (or push) and synchronism of speed, as between the several power-motor-propeller units, it being understood that a suitable form of propeller construction is used, such, for example, as one of those hereinbefore described, in which the reaction of the propeller must automatically come to that amount which is determined by the control unit. This results practically in synchronism of power delivered to the moving plane, but not necessarily synchronism of power generated by the power-motors. But in the scheme of Figure 18 I have also made provision for gang control of power generated, with the attendant advantages for certain uses and applications of the power-motor-propeller combinations. In the case of Figure 19 there is provided individual control of propellers for pull (or push); and the scheme of Figure 20 is in effect a hybrid of the two schemes of Figures 18 and 19.

In considering the various schematic arrangements hereinabove discussed it is to be clearly kept in mind that synchronization of pitch as such is a very different thing from variation of pitch for speed control; and especially that I have herein made distinct provision for synchronization of speeds by other means than pitch; as for example I have mentioned speed synchronization by throttle control in combination with pitch synchronization as such. Thus I am able to secure and make practical use of various benefits flowing from synchronization of pitch as such; and many of these benefits can be secured irrespective of any synchronization of speed, however such speed synchronization is effected.

In Figures 18, 19, 20 and 21 I have shown several schemes of connections of groups of propeller units embodying the features of the present invention, for obtaining various control arrangements, and for obtaining various synchronizing effects between said propeller units. These arrangements are shown in the present case to illustrate certain of the uses of propellers embodying the present invention. Said arrangements are also disclosed in another application for Letters Patent of the United States wherein said arrangements are claimed in their various arrangements and combinations.

I claim:

1. A variable pitch propeller for normal traction in a given direction including a support rotatable in direction of propeller rotation blade stub supporting means movable with respect to said support in direction substantially parallel to the direction of traction developed by the propeller rotation, means to vary the pitch of blades with said movement of said blade stub supporting means with respect to said support, movable means in connection with said blade stub supporting means, and means in connection with said movable means exerting a constant force on said movable means in direction opposite to traction developed by said propeller during its rotation, said force being constant throughout the range of movements of the blade stub supporting means, substantially as described.

2. Means as defined in claim 1 wherein said constant force means is hydraulic, substantially as described.

3. Means as defined in claim 2, wherein said hydraulic constant force means comprises a hydraulic chamber having an end wall in connection with said movable means and movable under the hydraulic force existing within said chamber and exerting a force on said movable means proportional to said hydraulic force existing within said chamber, and means to create within said chamber a hydraulic pressure of constant value with variable capacity of said chamber during movements of said end wall, substantially as described.

4. Means as defined in claim 3, together with means to adjust the value of said constant value hydraulic pressure, substantially as described.

5. Means as defined in claim 1 wherein said constant force means is electrical, substantially as described.

6. Means as defined in claim 5, together with means to adjust the amount of said constant value electrical force, substantially as described.

7. Means as defined in claim 1, together with means to adjust said constant force to a value of selected amount, substantially as described.

8. A variable pitch propeller for normal traction in a given direction including a support rotatable in direction of propeller rotation, blade stub supporting means movable with respect to said support in direction substantially parallel to the direction of traction developed by the propeller rotation, and non-rotatable on the first mentioned support, a blade having a blade stub rockingly mounted in the blade stub supporting means, a crank connected to the blade stub and of fixed length from the axis of rock of the blade stub in the blade stub supporting means, and a link of fixed length pivotally connected to said fixed length crank and to the first mentioned support, the pivotal connection of the link to the first mentioned support lying substantially in the plane which includes the axis of propeller rotation and the axis of the blade, said crank extending from the axis of the blade in a direction substantially normal to said plane when the blade is in substantially full traction position, whereby longitudinal movement of the blade stub supporting means with respect to the first mentioned support and with respect to the pivotal connection of the link with said support serves to rock the blade stub in the blade stub supporting means to effect change of blade pitch, substantially as described.

9. Means as specified in claim 8, together with means to shift said pivotal connection of the link to the first mentioned support to thereby change the pitch angle of the blade for specified positions of the blade stub supporting means with respect to the first mentioned support, substantially as described.

10. Means as specified in claim 9, together with a centrifugal responsive device carried by the propeller and responsive to rotative speed of the propeller, and an operative connection from the centrifugal responsive device to the pivotal connection shifting means effective to shift the pivotal connection position with change of propeller speed, said parts acting to increase blade pitch with increase of propeller speed and to reduce blade pitch with decrease of propeller speed, substantially as described.

11. A variable pitch propeller for normal traction in a given direction including a support rotatable in direction of propeller rotation, blade stub supporting means movable with respect to said support in direction substantially parallel to the direction of traction developed by the propeller rotation, and means to vary the pitch of the blades with said movement of said blade stub supporting means with respect to said support, the traction exerted by said propeller increasing with increase of blade pitch to a maximum amount for specified operating conditions including rotative speed of the propeller, and said traction thereafter decreasing with further increase of blade pitch under said operating conditions, said blade pitch varying means being operable through a range of pitches including said maximum traction pitch and pitches of both greater and lesser amount than said maximum traction pitch, together with spring means exerting a force acting on the blade stub supporting means in the direction of normal traction of the propeller, the force exerted by said spring means being supplemental to the normal traction force exerted by the propeller at blade pitches equal to and greater than said maximum traction pitch, together with movable means in connection with said blade stub supporting means, and means in connection with said movable means exerting a constant force on said movable means in direction opposite to traction developed by said propeller during its rotation and opposite to the force of said supplemental spring force means, substantially as described.

12. Means as defined in claim 11 wherein said supplemental force spring means is operable on the blade stub supporting means only for pitch values equal to or greater than said maximum traction pitch value, substantially as described.

13. A variable pitch propeller for normal traction in a given direction including a support rotatable in direction of propeller rotation, blade stub supporting means movable with respect to said support in direction substantially parallel to the direction of traction developed by the propeller rotation, and means to vary the pitch of the blades with said movement of said blade stub supporting means with respect to said support, the traction exerted by said propeller increasing with increase of blade pitch to a maximum amount for specified operating conditions including rotative speed of the propeller, and said traction thereafter decreasing with further increase of blade pitch under said operating conditions, said blade pitch varying means being operable through a range of pitches including said maximum traction pitch and pitches of both greater and lesser amount than said maximum traction pitch, together with spring means exerting a force acting on the blade stub supporting means in the direction of normal traction of the propeller, the force exerted by said spring means being supplemental to the normal traction force exerted by the propeller at blade pitches equal to and greater than said maximum traction pitch, together with movable means in connection with said blade stub supporting means, and hydraulic means in connection with said movable means to exert a constant force acting in direction opposite to the normal traction of the blade stub supporting means to resist movement of said blade stub supporting means under normal traction of said propeller during its rotation and to balance the force of said supplemental spring force, substantially as described.

14. A variable pitch propeller for normal traction in a given direction including a support rotatable in direction of propeller rotation, blade stub supporting means movable with respect to said support in direction substantially parallel to the direction of traction developed by the propeller rotation, and means to vary the pitch of the blades with said movement of said blade stub supporting means with respect to said support, the traction exerted by said propeller increasing with increase of blade pitch to a maximum amount for specified operating conditions including rotative speed of the propeller, and said traction thereafter decreasing with further increase of blade pitch under said operating conditions, said blade pitch varying means being operable through a range of pitches including said maximum traction pitch and pitches of both greater and lesser amount than said maximum traction pitch, together with spring means exerting a force acting on the blade stub supporting means in the direction of normal traction of the propeller, the force exerted by said spring means being supplemental to the normal traction force exerted by the propeller at blade pitches equal to and greater than said maximum traction pitch, together with movable means in connection with said blade stub supporting means, and electrical means in connection with said movable means to exert a constant force acting in direction opposite to the normal traction direction of the blade stub supporting means to resist movement of said blade stub supporting means under normal traction of said propeller during its rotation and to balance the force of said supplemental spring force means, substantially as described.

THOS. A. BANNING, Jr.

REFERENCES CITED

The following references are of record in the file of this patent:

UNITED STATES PATENTS

| Number | Name | Date |
|---|---|---|
| 1,310,330 | Ferrier | July 15, 1919 |
| 1,723,617 | Hele-Shaw et al. | Aug. 6, 1929 |
| 1,936,677 | Kozub | Nov. 28, 1933 |
| 1,952,800 | Havill | Mar. 27, 1934 |
| 1,980,248 | Bates | Nov. 13, 1934 |
| 1,982,170 | Lansing | Nov. 27, 1934 |
| 1,987,651 | Wiegand | Jan. 15, 1935 |
| 2,019,966 | Havill | Nov. 5, 1935 |
| 2,307,039 | Hammond | Jan. 5, 1943 |
| 2,314,610 | Day | Mar. 23, 1943 |
| 2,339,090 | McIntosh | Jan. 11, 1944 |
| 2,352,186 | Corrigan | June 27, 1944 |
| 2,374,276 | French | Apr. 24, 1945 |
| 2,468,004 | Walker | Apr. 19, 1949 |

FOREIGN PATENTS

| Number | Country | Date |
|---|---|---|
| 529,947 | France | Sept. 21, 1921 |
| 791,526 | France | Sept. 30, 1935 |
| 798,926 | France | Mar. 14, 1936 |
| 333,471 | Germany | Feb. 26, 1921 |
| 467,488 | Great Britain | June 17, 1937 |